June 27, 1933.  L. R. CARPENTER  1,915,516
PROCESS FOR EXTRACTING COW'S MILK BY VACUUM
Filed June 24, 1931  2 Sheets-Sheet 1
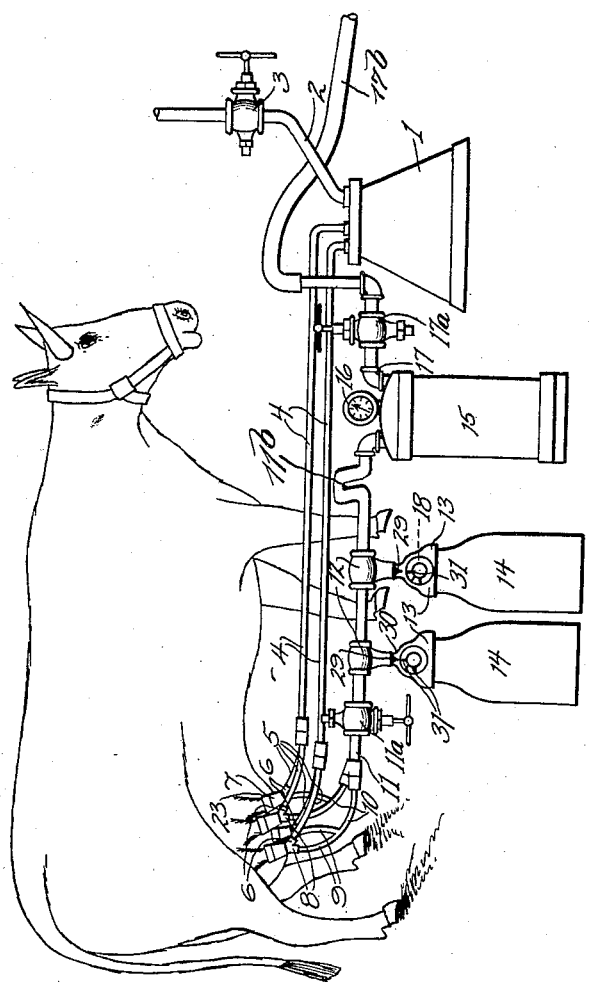
Leroy R. Carpenter
INVENTOR
BY Victor J. Evans
ATTORNEYS June 27, 1933.  L. R. CARPENTER  1,915,516
PROCESS FOR EXTRACTING COW'S MILK BY VACUUM
Filed June 24, 1931    2 Sheets-Sheet 2
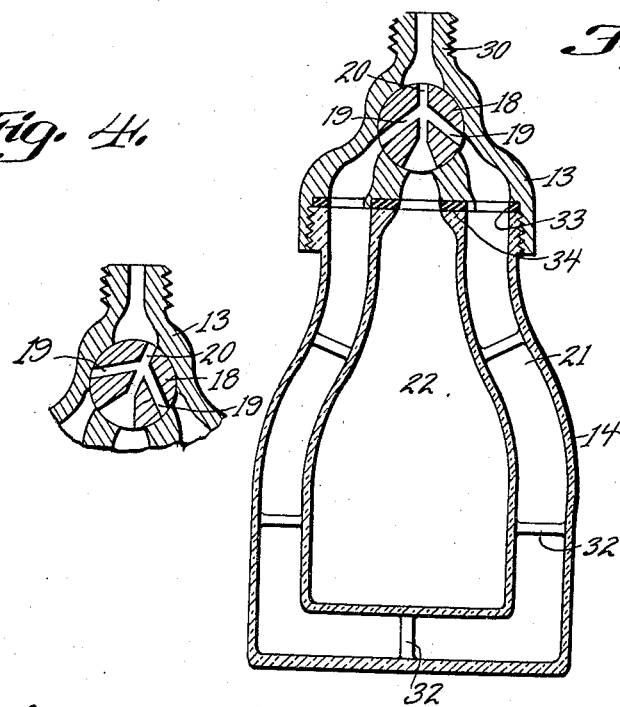
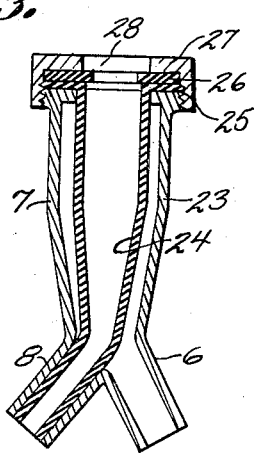
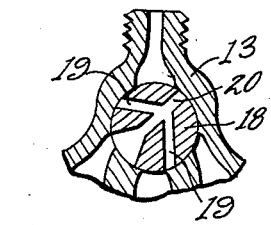
Leroy R. Carpenter
INVENTOR
BY Victor J. Evans & Co
ATTORNEYS Patented June 27, 1933

1,915,516

UNITED STATES PATENT OFFICE

LEROY R. CARPENTER, OF MANHEIM, PENNSYLVANIA

PROCESS FOR EXTRACTING COW'S MILK BY VACUUM

Application filed June 24, 1931. Serial No. 546,617.

The present invention relates to an improved process for extracting milk from the cow's udder through the medium of a vacuum, the steps of the process to be carried out through the medium of an apparatus herein set forth and illustrated, which is so used as to prevent the milk when extracted from coming in contact with any of the gases in the atmosphere thereby rendering the milk free from living bacteria. The oxidation caused by the gases in the air acting on the sugar or glucose of the milk causes fermentation. In this process fermentation is entirely eliminated, therefore the raw milk keeps just as long as it is kept in a clean container sealed against the entering of living bacteria or gases which cause fermentation.

It is well known, that while receptacles, heretofore have been thoroughly sterilized, the milk when leaving the cow, and when the receptacles left uncovered and when bottling, the milk will either gather live bacteria or be exposed to oxidation therefore it is the purpose to prevent the milk from being exposed to either the living bacteria or the gases in the atmosphere, and hence eliminate pasteurization or any other form of sterilization of the milk, which after fermentation has set in it can never again be put back to its natural state.

It is known that raw milk, which has not been subjected to oxidation when leaving the udder and at no time thereafter, will not have a bacteria count providing the receptacle did not contain living germs. If there is no bacteria count there can be no fermenting or spoiling of the milk.

To accomplish the essential purpose in this process the milk is extracted from the cow through the medium of a vacuum, and at no time during the extraction until the milk is bottled is it permitted to be exposed to the gases in the air. Operative connections from the cow's teats to the bottles are used, utilizing teat cups carried by the operative connections for the reception of the cow's teats, there being means carried by the bottles to permit the milk to pass to the bottles and at no time be exposed to the gases in the atmosphere, enabling the milk to be extracted and bottled, and kept as nature produced it.

Another purpose is to provide, in a process of this kind, a vacuum device with a connection to the teat cups, and a pulsator to create pulsations at the teats in the outer chamber of the teat cup which has no connection to the vacuum which carries away the milk. The milk is automatically extracted by the manipulation of the teats in the outer chamber of the teat cup the milk entering the thoroughly sterilized bottles in which a vacuum has been previously created.

Still another purpose of this invention is to provide double walled containers having a vacuum space between the inner and outer walls thereof, so that in the operation of the process a vacuum is created in said space and in the inner chamber of the container, the vacuum is retained in said space, milk is allowed to enter the inner chamber, and the inner chamber is then closed, thereby preventing the milk from being exposed to the gases in the atmosphere.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1 is a view in elevation, showing an apparatus for carrying out this improved process.

Figure 2 is an enlarged detailed view of one of the containers for keeping the milk from contact with the air.

Figure 3 is a detail sectional view of a teat cup used in carrying out the process.

Figure 4 is a sectional view through the head 13 of one of the containers 14, showing another position of the valve 18, wherein the vacuum space 21 is closed.

Figure 5 is a sectional view through the head 13 of one of the containers 14 illustrating another position of the valve 18, where the inner vacuum chamber 22 and the vacuum space 21 are both closed.

Referring to the drawings, 1 identifies a conventional type of pulsator, to which a tube 2 is connected, for the passage of air and to create a vacuum, and this tube is provided with a suitable valve 3.

Air lines 4 have certain of their ends connected to the pulsator, while their other ends merge into branches 5, which in turn are connected to branch extensions 6 of a plurality of teat cups 7.

The other of the branches 8 of the teat cups are in turn connected to branches 9 of the tubular connections 10 of the tube 11. This tube 11 is connected by T's 12 to the heads 13 of the containers 14. The tube 11 is also connected operatively to a conventional type of vacuum storing device 15, which is provided with a vacuum gauge 16 of conventional construction. The vacuum device 15 has a spout 17 for permitting drawing out about fifteen inch vacuum, the spout being then closed and kept closed during the entire period of milking by means of a valve.

In operation, the pulsator creates pulsations at the cow's teats and since a vacuum is created in the device 15, the milk is extracted from the cow and feeds through the branches 9 and 10 and through the tube 11 and empties into the containers 14.

The head of each container 14 is screwed or otherwise fastened on the bottle and is provided with a valve 18 having passages or openings 19 and 20, which are designed to register with the vacuum space 21 between the inner and outer walls of the container and the interior chamber 22, so as to create a vacuum in the chamber and said space. After the vacuum is created therein, the valve may be actuated to move the opening or passage 19 out of register with the space 21, leaving the passage or opening 20 to register with the chamber 22 so that the milk may enter the inner chamber. After the container is sealed the valve may be rotated to close the inner chamber 22, the space 21 still remaining closed.

In this manner the milk at no time is exposed to the gases in the atmosphere, and due to the fact that the milk is surrounded by a vacuum space, the milk is not subjected to oxidation which causes fermentation and since the milk is not exposed to the air, it is relieved of any chance for fermentation there being no necessity of pasteurization or any other form of sterilization.

Each teat cup comprises a main body 23 constructed of metal, preferably aluminum, with its inner surface lined with pliable leak proof rubber as shown at 24. The top portion of each teat cup receives a metal washer 25, a rubber disc 26, there being a cap 27 screwed or otherwise fitted to the outer wall of the teat cup, so as to retain the rubber and metal washers in position. It will be noted that the rubber disc has a central opening, which is of less diameter than the opening in the metal washer and of less diameter than the opening 28 in the cap, so that the opening in the rubber disc will fit tight around the cow's teat and thereby enable the pulsation in the outer chamber and the vacuum in the inner chamber to cause an extraction of the milk.

Referring to Figure 1 it will be noted that indicators or arrows 29 are provided on the exterior of the extensions 30 of the heads 13, and applied to projecting ends of the valves proper 18 are three graduations or marks 31, which register with the indicator in order to show the position of the valves as in Figures 2, 4 and 5. The graduation or mark which registers with the arrow or indicator 29 in Figure 1 indicates the position of the valve 18 as in Figure 2. The next mark or graduation will indicate the position in Figure 4, while the third graduation or mark will indicate the position shown in Figure 5, so that the operator at all times may know the position of the valve. The container 14 may be made in any suitable manner and constructed of any suitable material, and the walls of the chambers 22 are connected by suitable ribs 32 to the outer walls of the containers as in Figure 2.

In carrying out this process the apparatus is first operatively connected to the cow, the valves 18, the valves 11a and 17a being open. A suitable suction machine may then be attached to the hose 17b, drawing most of the air from the pipe line 11 and connections 9 and 10 to the cow's udder and from the containers 14 and from the vacuum tank 15. The valve 11a is then closed, and then the suction machine is operated to create a substantial vacuum in the two compartments of the containers 14 and in the tank 15 the vacuum approximating fifteen inches. After this amount of vacuum has been created the valve 17a is then closed, retaining the vacuum in the containers and the tank 15, after which the valve 11a is gradually opened, so that the milk may leave the udder and pass into the containers 14. The pipe line or tube 11 has an upward bend constituting a trap, to prevent the milk, when the valve 11a is open from passing the upward bend and entering the vacuum tank 15. The idea of gradually opening the valve 11a is to permit a gradual action adjacent the teats of the upper to occur, then the valve 11a may be opened to its full capacity until the containers 14 are filled. After filling the containers the valves 11a and 17a are closed, while the valves 18 may then be positioned as shown in Figure 5, which will prevent air from coming in contact with the raw milk.

Disposed between the head of each container and the body are washers 33 and 34 to insure airtight connections.

After the containers 14 are filled, they may be emptied in other receptacles, performing this operation in a vacuum in any suitable manner thereby keeping the milk free from contact with the atmosphere. In a plant there may be anywhere from twenty five to one hundred cows to be milked, and in this case the milk may be transferred from the containers into several vats, still keeping the milk in a vacuum in any suitable manner during this transfer, the vats also previously having a vacuum, hence keeping the milk free from the bacteria in the atmosphere.

Having described the invention what is claimed is:

In a process for milking cows by means of a vacuum, the steps consisting in creating a vacuum between a vacuum tank and the cow's teats, communicating several milk containers with the vacuum in the tank, shutting off the vacuum between the teats and the containers, creating additional vacuum in the containers to substantially fifteen inches, gradually communicating the last named vacuum with the teats until the full vacuum is applied to the teats and causing pulsations on the teats, which will then cause the milk to expel thereby affording a step by step milk extraction by means of which none of the gases in the exterior atmosphere may come in contact with the milk during extraction.

In testimony whereof I affix my signature.

LEROY R. CARPENTER.